United States Patent
Webeling et al.

[11] Patent Number: 5,876,689
[45] Date of Patent: Mar. 2, 1999

[54] PROCESS FOR THE MANUFACTURE OF MILK OF LIME

[75] Inventors: Michael Webeling, Wülfrath; Ulrich Glinka, Wöllstein; Jürgen Labuschewski, Iserlohn; Walter Hess, Hilden, all of Germany

[73] Assignees: Rheinische Kalksteinwerke GmbH, Wulfrath; Deutsche Babcock Anlagen GmbH, Oberhausen; City of Hagen, Hagen, all of Germany

[21] Appl. No.: 974,722

[22] Filed: Nov. 19, 1997

Related U.S. Application Data

[63] Continuation of Ser. No. 619,065, Mar. 20, 1996, abandoned.

[30] Foreign Application Priority Data

Mar. 21, 1995 [DE] Germany .................. 195 10 122.7

[51] Int. Cl.$^6$ ................................. C01F 11/02
[52] U.S. Cl. ............................. 423/640; 423/640
[58] Field of Search ............................. 423/640

[56] References Cited

U.S. PATENT DOCUMENTS

| | | |
|---|---|---|
| 4,636,379 | 1/1987 | Bestek et al. |
| 5,223,239 | 6/1993 | Moran et al. |
| 5,502,021 | 3/1996 | Schuster . |
| 5,707,141 | 1/1998 | Dumont et al. .................. 423/640 |

FOREIGN PATENT DOCUMENTS

| | | |
|---|---|---|
| 19510122 | 8/1996 | Germany . |
| 4034417 | 3/1998 | Germany . |

*Primary Examiner*—Wayne Langel
*Attorney, Agent, or Firm*—Nils H. Ljungman and Associates

[57] ABSTRACT

During the manufacture of milk of lime by the suspension of lime hydrate which has a large specific surface and was manufactured with the use of organic solvents and/or organic additives, a stable foam forms which can cause problems in the equipment. This foaming can be prevented during the suspension of the modified lime hydrate in water by the presence of finely-powdered activated cokes.

12 Claims, 3 Drawing Sheets

PROCESS FOR THE MANUFACTURE OF MILK OF LIME

CROSS-REFERENCE TO RELATED APPLICATIONS

This application is a continuation application of U.S. patent application Ser. No. 08/619,065, which was filed on Mar. 20, 1996, abandoned, and which claims priority from Federal Republic of Germany Patent Application No. 195 10 122 filed on Mar. 21, 1995.

BACKGROUND OF THE INVENTION

1. Field of the Invention

The present invention generally relates to a process for the manufacture of milk of lime.

2. Background Information

Milk of lime is generally manufactured by quenching burnt lime with a large excess of water. The term "burnt lime" is used to designate both burnt limes (calcium oxide, CaO) and burnt dolomite limes (calcium/magnesium oxide, CaO/MgO).

In special applications, lime which has been quenched to powder or dolomite lime in the form of a dry lime hydrate (calcium hydroxide, $Ca(OH)_2$) or dolomite lime hydrate (calcium/magnesium hydroxide, $Mg(OH)_2/Ca(OH)_2$) can also be suspended in water. The lime hydrates manufactured by the conventional quenching processes, which are designated normal hydrates, typically have a characteristic specific surface of 15 to 22 $m^2/g$.

Milk of lime can be used, among other things, to clean gases and exhaust gases, e.g. according to the spray sorption principle, by spraying milk of lime into the current of exhaust gas, and then removing the dry residue by means of appropriate filters.

For certain applications, e.g. for cleaning gases and exhaust gases according to the spray sorption principle, milk of lime on the basis of hydrates which have a specific surface greater than 22 $m^2/g$ can have significant advantages. Such hydrates with increased specific surface can be manufactured, for example, according to the process disclosed in German Patent No. 34 33 228, which corresponds to U.S. Pat. No. 4,636,379, or WO 92/09528. Alcohols such as methanol, ethanol, propanol and butanol, and ketone, ether and aldehyde, for example, can be used as organic solvents. Amines and glycols can be used as organic additives, e.g. ethylene glycol, diethylene glycol, triethylene glycol, monoethanolamine, diethanolamine, triethanolamine and mixtures of these products. The characteristic specific surface is typically greater than 30 $m^2/g$.

Compared to normal milk of lime manufactured from burnt lime, milk of lime manufactured by suspending lime hydrate which has a large specific surface in water, can reduce the lime consumption in the spray sorption process, e.g. as used in a waste incinerator, by about 40% while still achieving essentially the same cleaning action. There is also about 30% less residue from the cleaning of the exhaust gas. The use of normal milk of lime can present significant problems in conventional exhaust gas cleaning systems due to the stoichiometric ratios which must be maintained. The use of milk of lime manufactured from hydrate which has a large specific surface can make it possible to comply with the environmental requirements for waste gas cleaning essentially without any problem, for a normal composition of the exhaust gas.

One disadvantage which has been identified is that during the suspension of these lime hydrates which have been quenched with the addition of organic solvents and/or organic additives, a stable foam can be formed, which foam can lead to problems in the equipment which is part of the gas cleaning system.

OBJECT OF THE INVENTION

The object of the present invention is to create a process for the manufacture of milk of lime, in which process lime hydrates manufactured with the use of organic solvents and/or organic additives and which have a large specific surface can be used, essentially without the occurrence of foaming.

SUMMARY OF THE INVENTION

The present invention teaches that this object can be achieved if the milk of lime is manufactured by suspending the lime hydrate and/or dolomite lime hydrate, which lime hydrate or dolomite lime hydrate has been manufactured with the use of organic solvents and/or organic additives, and whereby the lime hydrate or dolomite lime hydrate has a specific surface which is greater than that of normal hydrate, in water in the presence of finely-powdered activated cokes. "Activated coke" is used as a term commonly used for products which are obtained by a low-temperature coking of coals or peat, and which products have a large internal specific surface. The product obtained from the subsequent activation, e.g. by water vapor, is generally designated activated carbon. The product obtained in the open hearth furnace process from brown coal is called open hearth furnace brown coal coke. Preference is given to the use of activated cokes in proportions by weight of 0.2% to 3% in relation to the dry lime hydrate.

The process in accordance with the present invention can also be carried out by mixing lime hydrate, or dolomite lime hydrate, with the activated cokes before the suspension in water, or by mixing the activated cokes with the water before or after the addition of the lime or dolomite lime hydrate to the water.

In accordance with an additional embodiment of the present invention, the activated cokes can be added to the burnt lime or to the quenching water during the manufacture of the lime hydrate and/or dolomite lime hydrate.

The above discussed embodiments of the present invention will be described further hereinbelow with reference to the accompanying figures. When the word "invention" is used in this specification, the word "invention" includes "inventions", that is, the plural of "invention". By stating "invention", the Applicant does not in any way admit that the present application does not include more than one patentably and non-obviously distinct invention, and maintains that this application may include more than one patentably and non-obviously distinct invention. The Applicant hereby asserts that the disclosure of this application may include more than one invention, and, in the event that there is more than one invention, that these inventions may be patentable and non-obvious one with respect to the other.

One aspect of the invention resides broadly in a process for reducing foaming during the manufacture of milk of lime, the process comprising: quenching at least one of: lime hydrates and dolomite lime hydrates with at least one of: organic solvents and organic additives; and suspending the at least one of: lime hydrates and dolomite lime hydrates having a specific surface larger than normal hydrate in water in the presence of finely-powdered activated cokes, to thereby reduce foaming.

BRIEF DESCRIPTION OF THE DRAWINGS

The present invention is explained in greater detail herebelow with reference to two examples and the following drawings, in which.

DESCRIPTION OF THE PREFERRED EMBODIMENT

The present invention is explained in greater detail below with reference to two examples:

EXAMPLE 1

Following the intensive dispersal of lime hydrate, manufactured as disclosed in German Patent No. 34 33 228, which corresponds to U.S. Pat. No. 4,636,379 and which is discussed in detail herebelow, to a 15% suspension, there is a foam volume of 250 ml of foam/kg of milk of lime. When lime hydrate is mixed with 1% activated carbon dust and then dispersed in water to form a 15% suspension, foaming is completely prevented.

EXAMPLE 2

Following the dispersal of lime hydrate, manufactured as disclosed in German Patent DE 34 33 228 (which corresponds to U.S. Pat. No. 4,636,379), to a 20% suspension, there is a foam volume of 260 ml of foam/kg of milk of lime. If 2% finely-divided open hearth furnace coke is added to the water in advance, the foam volume is reduced to 20 ml of foam/kg of milk of lime.

As mentioned hereinabove, it is preferable to use activated cokes in proportions by weight of or about 0.2% to 3% in relation to the dry lime hydrate.

In accordance with certain embodiments of the present invention, the following examples may be considered to be within the scope of the present invention:

Following the intensive dispersal of lime hydrate, manufactured as disclosed in German Patent No. 34 33 228 and U.S. Pat. No. 4,636,379 discussed in detail herebelow, to about a 15% suspension, there can be a foam volume of about 250 ml of foam/kg of milk of lime. When lime hydrate is mixed with about 1% of activated carbon dust and then dispersed in water to form about a 15% suspension, it may be possible to completely prevent foaming.

Following the dispersal of lime hydrate, manufactured as disclosed in Patent DE 34 33 228 (which corresponds to U.S. Pat. No. 4,636,379), to about a 20% suspension, there is a foam volume of about 260 ml of foam/kg of milk of lime. If about 2% finely-divided open hearth furnace coke is added to the water in advance, the foam volume can be reduced to about 20 ml of foam/kg of milk of lime.

Figure 1:
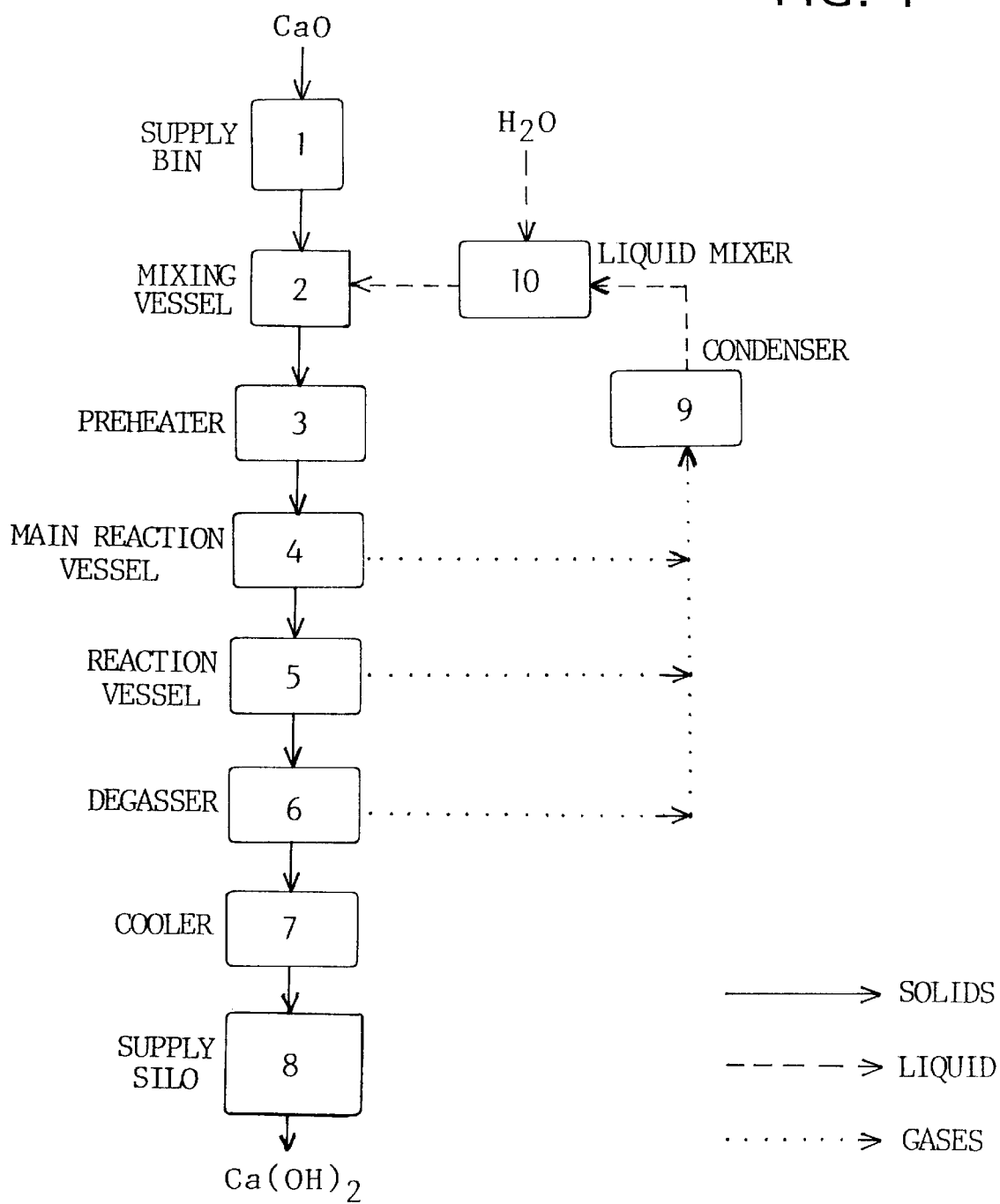
FIG. 1 shows a flow diagram illustrating a process for producing calcium hydroxide.

The disclosure now turns to one example of a process for manufacturing lime hydrate, as mentioned briefly above, with particular reference to FIG. 1 and the following tables. This process can be used to produce dry calcium hydroxide by slaking finely divided or ground, soft-burned lime, whereby the lime is intensively and homogenously mixed with a slaking liquid consisting of water and a reaction-retarding organic solvent.

Although the processes of lime slaking and lime burning are well known and widely used, the details of the basic mechanisms involved are still not completely known. It is known that the rate of slaking is mainly dependent upon the condition of the burnt lime. On one band, a high degree of burning decreases the slaking rate due to the fact that the crystallites become coarser, leading to a reduction in the specific surface and porosity. As a rule, these changes are related to an undesirable reduction of the specific surface of the calcium hydroxides resulting from the dry slaking process ("Zement-Kalk-Gips" 23, (1970), p. 519). On the other band, lower burning temperatures lead to correspondingly high slaking rates and greater specific surfaces. The higher temperatures occurring with a more rapid slaking reaction accelerate the slaking process even more and may be the cause of an undesirable, more pronounced agglomeration of the primary particles.

In the industrial process, the so-called grits forming due to agglomeration must be separated from the more desired reactive products by screening or sifting.

The calcium hydroxide obtained in current production operations is the result of several overlapping reactions. A. Backman ("Zement-Kalk-Gips" 9, (1956), pp. 262–275) makes a distinction between various successive phases: Water absorption, formation of the intermediate product, reaction of the adduct to hydroxide according to the reaction formula:

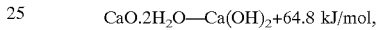

$$CaO.2H_2O \longrightarrow Ca(OH)_2 + 64.8 \text{ kJ/mol},$$

and finally after-flocculation or agglomeration formulation of the final product. With the above course of reaction, the initial mixture passes from the initially aqueous suspension through a solid phase which, finally, decomposes to form a finely divided end product.

Such a course of the slaking reaction can be observed only with relatively hard-burnt lime and particularly in a batch operation. The individual phase times are very short and cannot be separated on a large industrial scale with higher throughput rates. This applies in particular to current operations in which mainly soft-burnt lime quantities are used. In such operations the slaking phases take place at very nearly the same time one next to the other or in parallel, which means the reaction cannot be influenced or controlled even though large industrial plants may be designed for several stages. This is related also to the fact that the reaction is not slowed down by the evaporating water, but rather is accelerated.

As a rule, when processing limes with particularly high reactivity for lime slaking in conventional plants, the formation of hydrate begins even before the slaking water is homogenously blended into the mixture, with the result that the temperature development in the mixture of burnt lime and water to be reacted is very uneven and may greatly exceed the desirable temperature range at individual points. At the same time, the formation of steam leads to steam slaking which has an adverse effect on the final result because calcium hydroxides with reduced reactivity are thus formed. Separation of the individual stages and their optimal execution is not possible in spite of the fact that industrial lime slaking plants are designed for "several stages" so that the advantages of exact reaction control cannot be exploited. The resulting crude hydrate, contrary to the use of softer-burnt lime, contains even more coarse waste, i.e. grits, than when processing harder-burnt lime because the slaking reactions are uncontrolled and take place in an uncontrollable manner.

Furthermore, it is well known that the slaking rate can be reaction-retarded by adding to the slaking water organic solvents. Particularly suitable are alcohols such as methanol, ethanol, propanol and butanol, as well as ketones, ethers and aldehydes. However, the use of organic solvents to regulate the acceleration of the slaking rate has generally only been accomplished on a laboratory scale. According to Backman, it is generally believed that a slaking process carried out with the use of organic solvents must be disregarded in view of the great expenditure it would require on an industrial scale.

Thus, the primary objective is to control the individual reaction steps in the dry slaking of lime by separation in terms of time and space, in such a way that reactive limes can be processed without substantial grit formation even on a large industrial scale, thereby producing a calcium hydroxide having an especially large specific surface. This objective can be accomplished by carrying out the blending of slaking liquid consisting of 30 to 50 parts by volume water and 70 to 50 parts by volume organic solvent with the lime at a temperature below 45° C. in a mixing vessel, subsequently transferring the reaction mixture into a main reaction vessel where the mixture is heated by means of a heating device to a temperature of from 50° to 70° C., and carrying out the final reaction in another reaction vessel. In the mixing vessel, the ratio of lime to slaking liquid is selected in such a way that a final reaction temperature of 85° to 110° C. is reached in the final reaction vessel. The calcium hydroxides so produced have a specific surface of 35 to 55 $m^2/g$ as compared to the calcium hydroxides usually produced having a specific surface of 13 to 19 $m^2/g$. The specific surface of the calcium hydroxides is thus increased by a factor of 2 to 3. Accordingly, the reactivity of such calcium hydroxides is higher. Performing this process in a number of reaction vessels permits a continuous production process.

Preferably, the slaking liquid is blended with the lime at a temperature below 30° C.

Another advantageous feature of the above process is that the reaction mixture is heated in a preheater preconnected to the main reaction vessel to accelerate the reaction thermally, and that the reaction mixture, before being transferred into the final reaction vessel, is kept in the main reactor until a temperature of 70° to 90° C. has been reached.

It is preferable if the finished calcium hydroxide is cooled in a cooler to temperatures below 50° C. in order to prevent the reactive calcium hydroxide from changing when stored at an elevated temperature.

Preferably, the process is engineered in such a way that the reaction mixture is conveyed through the main reactor by means of a plow blade mixer, single or double paddle screw mixer, or conveyor belt.

Furthermore, it is also preferable to include a degassing step following the reaction in the final reaction vessel in which solvent in the finished calcium hydroxide is removed therefrom by application of a vacuum and/or washing with an inert gas in order to assure product purity and the cost saving reuse of solvents.

In accordance with the above process, a finely dispersed calcium hydroxide with particularly high specific surface and high reactivity is obtained. When processing fine limes, no grits of any type are produced, even if the reactivity of the lime is very high. When processing finely divided or particulate burnt lime, the amount of grit formed in the process amounts to only about ⅓ of the quantity formed in conventional slaking plants.

Dry reactive calcium hydroxide with a very large surface is well suited for detoxicating the off-gases in refuse incinerators, which means that the availability of such products on an industrial scale is significant. As a rule, the products obtained in conventional slaking plants are less suitable for said purpose. Their surface (specific surface) is generally too small, as a rule, so that to some extent, the amount of absorbent required for bonding with harmful substances exceeds the stoichiometric quantity by several times.

FIG. 1 shows the flow diagram in accordance with the above-described process for producing calcium hydroxide. With reference to FIG. 1, fine white lime is taken from a supply bunker or bin 1 and loaded in a mixing vessel 2 equipped with a high-speed agitator. Mixing vessel 2 is fitted with a cooling system and is first loaded with the reaction liquid.

Following adequate homogenizing of the reaction mixture, the mixture is conveyed by way of preheater 3 into main reaction vessel 4. Reaction vessel 4 is designed, for example, as a thermally insulated twin paddle screw conveyor. Here, the reaction mixture, which solidifies as the reaction starts, is loosened up and then transferred as a coarsely crushed material to reaction vessel 5 for further reaction.

In the degassing stage of degasser 6, solvent in the finished calcium hydroxide is removed by applying a vacuum and/or using a washing or flushing gas.

On cooling of the calcium hydroxide in a cooler 7, the finished product is stored in a supply silo 8.

The organic vapors generated in the course of reaction in reactor vessels 2 to 6 are condensed in the afterconnected process stage of condensor 9, in which the organic phase is recovered with the help of, for example, a jet washer and column.

In another process state 10, the recovered condensate is mixed with the amount of water required to produce the reaction liquid to be reused.

The above-described process may also be used if stages (3), (4), and (5) are carried out in one reactor provided with a heating system. In this case, the process is usefully carried out as a batch (discontinuous) operation.

The above-described process is explained in greater detail with the help of the following examples:

EXAMPLE ACCORDING TO A KNOWN PROCESS

| Fine white lime | |
|---|---|
| Reactivity according to DIN 1060 | $t_u$ = 2 min |
| Quantity | 28 kg |
| Temperature | 20° C. |
| Water | |
| Quantity | 17.9 liters |
| Temperature | 20° C. |
| Solvent | |
| Quantity | — |
| Temperature | — |
| Mixture lime/slaking liquid | |
| Temperature during premixing | above 20° C. |
| Temperature after preheating | not applicable |
| Temperature after reaction | 124° C. |
| Finished product | |
| Quantity | 37 kg |
| Liter weight | 360 g/liter |
| Specific surface | 16 $m^2/g$ |

| Fine white lime | |
| --- | --- |
| Reactivity according to DIN 1060 | $t_u$ = 2 min |
| Quantity | 28 kg |
| Temperature | 20° C. |
| Water | |
| Quantity | 10.1 liters |
| Temperature | 20° C. |
| Solvent-Methanol | |
| Quantity | 14.2 kg |
| Temperature | 20° C. |
| Mixture lime/slaking liquid | |
| Temperature of premixture | 25° C. |
| Temperature after preheating | 59° C. |
| Temperature after reaction | 98° C. |
| Finished product | |
| Quantity | 37 kg |
| Liter weight | 270 g/liter |
| Specific surface | 36 m$^2$/g |

| Fine white lime | |
| --- | --- |
| Reactivity according to DIN 1060 | $t_u$ = 2 min |
| Quantity | 28 kg |
| Temperature | 20° C. |
| Water | |
| Quantity | 10.1 liters |
| Temperature | 20° C. |
| Solvent-Methanol | |
| Quantity | 15.2 kg |
| Temperature | 20° C. |
| Mixture lime/slaking liquid | |
| Temperature of premixture | 24° C. |
| Temperature after preheating | 59° C. |
| Temperature after reaction | 90° C. |
| Finished product | |
| Quantity | 37 kg |
| Liter weight | 280 g/liter |
| Specific surface | 41 m$^2$/g |

EXAMPLE 3' ACCORDING TO PROCESS WHICH CAN BE UTILIZED IN ACCORDANCE WITH THE PRESENT INVENTION

| Fine white lime | |
| --- | --- |
| Reactivity according to DIN 1060 | $t_u$ = 2 min |
| Quantity | 3.0 kg |
| Temperature | 20° C. |
| Water | |
| Quantity | 1.4 liter |
| Temperature | 20° C. |
| Solvent-2-methylpropanol-(2) | |
| Quantity | 2.9 liters |
| Temperature | 20° C. |
| Mixture lime/slaking liquid | |
| Temperature premixture | 23° C. |
| Temperature after preheating | 57° C. |
| Temperature after reaction | 92° C. |
| Finished Product | |
| Quantity | 4.0 kg |
| Liter weight | 270 g/liter |
| Specific surface | 42 m$^2$/g |

| Fine white lime | |
| --- | --- |
| Reactivity according to DIN 1060 | $t_u$ = 1.1 min |
| Quantity | 3.0 kg |
| Temperature | 10° C. |
| Water | |
| Quantity | 1.1 liters |
| Temperature | 10° C. |
| Solvent-Methanol | |
| Quantity | 2.1 liters |
| Temperature | 10° C. |
| Mixture lime/slaking liquid | |
| Temperature premixture | 32° C. |
| Temperature after preheating | 60° C. |
| Temperature after reaction | 96° C. |
| Finished product | |
| Quantity | 4.0 kg |
| Liter weight | 250 g/liter |
| Specific surface | 48 m$^2$g |

The disclosure now turns to an example of a method for the cleaning of exhaust gas and a composition for use with this method, with which the present invention may be utilized. It should be understood that components and/or materials discussed hereinabove may be considered to be interchangeable with components and/or materials discussed herebelow, if appropriate. More specifically, the disclosure now turns to an example of a powdered means for the cleaning of exhaust gases, e.g. gases exhausted from industrial smokestacks (smoke and chimney gases), employing the principle of dry adsorption. The powdered means generally includes a mixture of activated cokes with inert materials, which inert materials do not have any dust explosiveness.

As mentioned briefly above, activated cokes, such as activated carbon on a basis of hard coal or peat, or metallurgical cokes on a basis of brown coal, are sometimes used with the admixture of inert materials for cleaning exhaust gas. Such mixtures have been used to remove acid pollutants (e.g. sulfuric acid, nitric acid, hydrofluoric acid), organic substances such as chlorinated hydrocarbons (e.g. dioxins and furans), as well as heavy metals and heavy metal compounds from exhaust gas. In installations which function according to the airstream adsorption principle, such means are distributed as uniformly as possible in the current of smoke or chimney gas, react in flight when airborne with gaseous pollutants and other pollutants, and are precipitated on filters, along with other particulate constituents of the exhaust gas. The cleaned exhaust gas is then released through a chimney.

For the precipitation of acid pollutant gases, such as HCl, $SO_2$, $SO_3$ and HF in the airstream process, reactive calcium compounds have been used in the past, such as finely-divided calcium hydroxide, $Ca(OH)_2$. Calcium hydroxides for injection into the current of exhaust gases can be produced by various known processes, e.g. such as the process disclosed in German Patent DE 34 33 228, as discussed hereinabove.

Such known processes include the use of activated cokes, such as activated carbons and brown coal metallurgical cokes, for the removal of heavy metals, heavy metal compounds and organic compounds such as dioxins and furans, e.g. those which are found in the exhaust gases from municipal waste incineration plants.

One disadvantage of such processes is that when handling combustible adsorbents, even if the rules of the art are observed, the use of activated cokes can entail the risk of dust explosions. In mixtures of inert materials with activated cokes, mixtures which are typically considered as non-explosive generally include at least mixtures with a concentration of carbon of less than or equal to 30% by weight. But, there are additional safety requirements which must typically be met for the use of these powdered means which include activated cokes and inert materials. Unless the mixtures are inherently safe, precautionary measures to prevent explosions are essential, and such precautionary measures can significantly increase the cost of the airstream process. Under essentially no operating conditions may there be fluctuations in the concentration, as such fluctuations could form currents or even dust deposits which contain hazardous carbon concentrations.

In two-component mixtures, on the basis of reactive calcium compounds and powdered activated cokes, the granular structure of the individual components is so different that disruptive fluctuations in concentration are essentially unavoidable. With activated cokes, depending on the variety used, the maximum grain size which characterizes the granular structure can be between about 200 $\mu$m and about 500 $\mu$m, and with calcium hydroxide as the reactive calcium compound, the maximum grain size can be up to approximately 30 $\mu$m.

If such mixtures of different granular structure, e.g. mixtures of calcium hydroxide and activated coke, are used in the airstream process in exhaust gas cleaning systems, local fluctuations in concentration can occur in the flow field at points where there are centrifugal forces, such as in elbows. The larger particles are then enriched in the coarse grain fraction, i.e. there are higher carbon concentrations there.

It is essentially impossible to prevent small amounts of the coarse grain fraction which have an enriched carbon concentration from precipitating out of the flow field, and in particular at points through which there is not a strong flow. Laboratory tests with mixtures of calcium hydroxide and activated coke in laboratory wind sifters have shown that even with initial mixtures which have carbon concentrations of less than 30%, carbon enrichment can occur. Such carbon enrichments are generally unacceptable from a safety point of view.

It has been determined that this problem can essentially not be solved by the conventional grinding of the activated coke, in which the amount of coarse grain is limited so that even the coarsest particles can become airborne under the conditions of the airstream process (where the gas velocities are as low as 6 m/s).

Attempts to match or adjust the grain size distribution of the powdered activated cokes to the calcium hydroxide, so that both components have essentially the same distribution of the speed of vertical descent or drift, have shown that, of course, with sufficiently fine grinding, there are essentially no further fluctuations in the concentration. But, that would require that the activated carbons be ground down to approximately the grain size of the calcium hydroxide, i.e. to <50 $\mu$m. For technical reasons, grinding down activated carbons to match the grain size of calcium hydroxide would typically be difficult and time-consuming, as well as economically unacceptable.

Alternatively, if an attempt were made to agglomerate finely-divided calcium hydroxide to the point where the distribution of its speed of vertical descent or drift matched the distribution of the speed of vertical descent or drift of the activated coke, the effectiveness of the mixture for the separation of acid pollutant gases would be significantly reduced, so that such a solution also does not seem logical.

Therefore, it can be advantageous to prepare a mixture which contains powdered, activated coke, in which carbon is present in a concentration of up to 30% by weight and which, when used in essentially all fractions and under essentially all operating conditions in the airstream process, is not subject to any fluctuations in concentration, as such fluctuations, at oxygen concentrations of up to 21% by volume, would cause the formation of fractions which could cause dust explosions. Further, in the mixture, at least one inert component can be matched in terms of its grain size distribution to the grain size distribution of the activated coke components, so that in a gas medium at rest, the speed of vertical descent of the coarse grain of the inert components is equal to or greater than the speed of vertical descent of the coarse grain of the activated coke components.

Coarse grain, in accordance with at least one embodiment, can be defined as the particle size $d_{97}$, the cumulative value of which equals 97% of the particle size distribution (i.e. 97% of all the particles in the powder are smaller than $d_{97}$).

With an accuracy which is acceptable in practical terms, equal speeds of vertical descent in the gas medium are achieved when the $d_{97}$ values of the particle size distributions of the activated coke and of the inert material are in inverse proportion to the roots of the particle densities of activated coke and inert components (particle densities as defined in DIN 66160 (Deutsche Industrie-Norm or German Industrial Standards located at Deutsche Institut Fur Normung e.V., Sprachendienst, Post Fach 11 07, D-1000, Berlin 30, Federal Republic of Germany)).

In accordance with one embodiment, equal speeds of vertical descent in the gas medium can possibly be achieved when the $d_{97}$ values of the particle size distributions of the activated coke and of the inert material are in inverse proportion to the square roots of the particle densities of activated coke and inert components. In accordance with an alternative embodiment of the present invention, equal speeds of vertical descent in the gas medium can possibly be achieved when the $d_{97}$ values of the particle size distributions of the activated coke and of the inert material are in inverse proportion to the cube roots of the particle densities of activated coke and inert components.

A preferred mixture is one in which the slope or gradient of the grain size distribution line of at least one inert component with matching grain size (i.e. the inert component having a grain size matching the grain size of the activated coke) is equal to or greater than the slope of the grain size distribution line of the activated coke component (See DIN 66145 for a description of grain size distributions by RRSB (Rosin-Rammler-Sperling-Bennett lines). Further explanations of grain size distributions by RRSB can be found in the Journal of the Institute of Fuel, volume 7, pages 29, in an article by Rosin and Rammler, and in volume 10, page 22, in an article by Bennett.

In view of the above requirements, it has been determined that powdered limestone can be used as the inert material. It is generally known that limestone is essentially calcium carbonate with a possible magnesium carbonate content.

Reactive calcium compounds with non-matching grain sizes can be used as additional inert materials. Calcium hydroxide is particularly preferred for such a purpose.

Other inert materials could conceivably be used, such as pulverized granite, slate, or quartz. Further, it is also conceivable that other types of reactive calcium compounds could be used in addition to calcium hydroxide, such as calcium silicates, calcium alkalis, and calcium reactive silicas.

This powder mixture has been found to be useful in essentially all exhaust gas cleaning systems having separately operated, upstream or downstream adsorption stages which employ the airstream principle.

If several inert components are used to achieve a properly matching distribution of the speed of vertical descent, it is of particular advantage if safe carbonaceous mixtures for the airstream process can be manufactured which contain as little additional inert material as possible. Likewise, it is possible to use, as the inert material, one or more exhaust gas cleaning reagents, if the reagents act as inert material with respect to the explosiveness of powdered activated coke, and if the reagents are present in the desired grain size distribution. One preferred inert material which has been found to satisfy the above requirements is powdered limestone, which is available economically and in many finenesses of grind. Powdered limestone is not a pollutant and is in no way toxic.

Additional advantages of the preferred mixtures, as compared to the mixtures of the past, are that in mixtures of activated coke which use basic exhaust gas cleaning reagents as the inert material, it becomes possible to manufacture inherently safe mixtures with the smallest possible percentage of inert material which is matched to the grain size distribution of the activated coke and the percentage of carbon. In mixtures of activated cokes and an inert material which does not react with the exhaust gas, or reacts with it only to a limited extent, safe mixtures can be manufactured which contain carbon concentrations in percentages of up to 30%. The limitation of the percentages of inert components in the reagent preferably minimizes the amount which must be used and therefore can offer advantages in terms of cost.

In processes which employ the wet washing or scrubbing principle, the pre-cleaned exhaust gas can typically contain either no acid pollutant components or only very small concentrations of acid pollutant components. However, the pre-cleaned exhaust gas will still typically contain organic compounds and heavy metals.

In an upstream or downstream sorption stage, that is, upstream or downstream of the precleaning stage, one exhaust gas cleaning means for cleaning exhaust gas can preferably have the following composition (parts by weight in %):

25% activated coke breeze

70% inert material (e.g. powdered limestone) matching the grain size of the activated coke 5% highly-reactive calcium hydroxide The principal ingredient in such a mixture can be an economical inert material, the speed of vertical descent of which material preferably matches the coarse activated coke breeze. If, under extreme circumstances deposits do occur in the exhaust gas cleaning system, there would typically also be an inert material content in the deposit, which inert material can then prevent undesirable and hazardous carbon concentrations in these deposits. The highly-reactive calcium hydroxide component in this mixture preferably makes possible a residual separation of acid exhaust gas components, if necessary.

This example of a mixture represents a solution for gas scrubbing which has been found to be both economical and optimal in terms of safety with regard to the relevant pollutant components of the exhaust gas.

In the process which employs the principle of spray sorption, the pre-cleaned exhaust gas, depending on the type of operation, can contain significant concentrations of acid pollutant components, as well as organic compounds and heavy metals.

In this case, the exhaust gas cleaning means can have the following composition in a downstream exhaust gas cleaning (parts by weight in %):

10% activated coke breeze

10% inert material (e.g. powdered limestone) which matches the grain size of the activated coke 80% highly-reactive calcium hydroxide If such a mixture is used, in spite of the high reactivity of the calcium hydroxide additive with respect to acid pollutant components, minimal to no concentration fluctuations have been found to occur in any deposits which may occur, even in extreme cases, which fluctuations can lead to hazardous carbon concentrations.

The mixture can be used in spray sorption systems and also as a milk-of-lime suspension (i.e. a suspension of the mixture in water) in single-stage operations.

This example of a mixture represents a solution which is both economical and optimal from a safety point of view for spray sorptions of downstream exhaust gas cleaning systems with regard to the relative polluting components of the exhaust gas.

In processes which employ the dry sorption principle, depending on the type of operation, the pre-cleaned exhaust gas typically still contains significant concentrations of acid pollutant components as well as organic compounds and heavy metals.

In this case, the exhaust gas cleaning means can have the following composition (parts by weight in %):

5% activated coke breeze

3% inert material (e.g. powdered limestone) matching the grain size of the activated coke 92% highly-reactive calcium hydroxide The use of such a mixture can essentially provide an effective adsorption of acid pollutant components of the exhaust gas. Such a mixture can also essentially provide that, in the event of unfavorable conditions in the exhaust gas cleaning system, no deposits of coarse particles with unacceptably high carbon concentrations can occur.

The above examples of various compositions of mixtures show that it is possible to solve the problems of unacceptable fluctuations in carbon concentrations in deposited material both in separately operated adsorption stages, and in upstream or downstream adsorption stages, for the relevant pollutant components.

In Example 1", shown further below in the table, in accordance with a known mixture, the activated coke was ground to 0% residue at 75 $\mu$m (which is about the same as approximately 3% residue at 43 $\mu$m) and mixed with standard hydrate, that is, hydroxide.

Examples 2" to 21" are mixtures in accordance with the embodiments of the present invention. The mixtures 2" to 20" were prepared on the basis of classes of speeds of vertical descent, preferably in a gas medium at rest, so that in no class of the speed of vertical descent is there an activated coke concentration of more than about 30%. In Example 21", a maximum allowable concentration of activated coke of about 40% by weight was assumed not to be hazardous. In the three-component mixtures, the value required in actual practice for the proportion of inert material 1''' required to observe the maximum carbon concentration is less than the value shown, since coarse particles of coke and inert materials can entrain fine calcium hydroxide, and thus the actual carbon concentration will be less than about 30% or about 40% respectively. Therefore, in the table, the concentrations of inert material 1''' preferably are maximum values.

Examples 2" to 5" are two-component mixtures on the basis of activated coke and various inert materials. In the inert materials in Mixtures 2" to 4", the coarse grain of the inert materials has been matched to that of the activated coke. In Mixture 2", the inert material has also been matched with respect to the slope of the activated coke component. In Mixture 3", the grain size distribution of the inert material is steeper than the grain size distribution of the activated coke component. In Mixture 4", the grain size distribution of the inert material is flatter than the grain size distribution of the activated coke component. In Mixture 5", the coarse grain of the inert material is coarser than with the matched powdered limestones, and the slope of the grain size distribution, at about 0.98 μm, is approximately 0.25 steeper than the slope of the activated coke component. It is apparent that, in the two-component mixtures (Examples 2"–5") of activated coke and inert material 1''', in this case powdered limestone, the least inert material 1''' is needed if an inert material 1''' is used which matches in terms of the coarse grain (approximately 50% of the value of the coke) and slope ($n_{inert\ material\ 1'''} = n_{activated\ coke}$).

Examples 2", 5", 6" and 7" show that in the transition from a two-component mixture (activated coke and (coarse) inert material 1''') to a three-component mixture (activated coke, (coarse) inert material 1''' and (fine) inert material 2'''), with the inert material 1''' which ideally matches the activated coke, the proportions of inert material 1''' essentially cannot be reduced. However, in three-component mixtures, the proportion of inert material 1''' can be reduced if an inert material is used which is somewhat coarser, and the grain size distribution of which is somewhat steeper than the inert material 1''' which matches the activated coke (Examples 5", 8" to 11", 12" to 14", 15" to 17").

Examples 18" to 20" show that even with low activated coke concentrations, the proportion of inert material 1''' can be reduced from 57 parts to 26 or 16 parts, respectively, by the use of inert material 2'''. Example 21" shows that if a fluctuation of the concentration up to an activated coke concentration of up to about 40% is allowable, the (undesirable) concentration of inert material 1''' can be reduced from 16 to 11 parts.

TABLE

Compositions of various mixtures of activated cokes with inert materials

| Example No. | Activated Coke | Inert Material 1''' | Inert Material 2''' |
|---|---|---|---|
| 1" | Activated Coke A 30 parts | | Calcium hydroxide A 70 parts |
| 2" | Activated Coke D 30 parts | Inert material A 70 parts | |
| 3" | Activated Coke D 30 parts | Inert material B 189 parts | |
| 4" | Activated Coke D 30 parts | Inert material C 93 parts | |
| 5" | Activated Coke D 30 parts | Inert material D 170 parts | |
| 6" | Activated Coke D 30 parts | Inert material A max. 70 parts | Calcium hydroxide A 70 parts |
| 7" | Activated Coke D 30 parts | Inert material A max. 70 parts | Calcium hydroxide B 70 parts |
| 8" | Activated Coke D 30 parts | Inert material D max. 63 parts | Calcium hydroxide A 70 parts |
| 9" | Activated Coke D 30 parts | Inert material D max. 59 parts | Calcium hydroxide B 70 parts |
| 10" | Activated Coke D 30 parts | Inert material D max. 77 parts | Calcium hydroxide A 10 parts |
| 11" | Activated Coke D 30 parts | Inert material D max. 102 parts | Calcium hydroxide B 10 parts |
| 12" | Activated Coke B 30 parts | Inert material D 95 parts | |
| 13" | Activated Coke B 30 parts | Inert material D max. 80 parts | Calcium hydroxide A 70 parts |
| 14" | Activated Coke B 30 parts | Inert material D max. 74 parts | Calcium hydroxide B 70 parts |
| 15" | Activated Coke C 30 parts | Inert material E 91 parts | |
| 16" | Activated Coke C 30 parts | Inert material E max. 72 parts | Calcium hydroxide A 70 parts |
| 17" | Activated Coke C 30 parts | Inert material E max. 73 parts | Calcium hydroxide B 70 parts |
| 18" | Activated Coke D 10 parts | Inert material D 57 parts | |
| 19" | Activated Coke D 10 parts | Inert material D max. 26 parts | Calcium hydroxide B 10 parts |
| 20" | Activated Coke D 10 parts | Inert material D max. 16 parts | Calcium hydroxide B 90 parts |
| 21" | Activated Coke D 10 parts | Inert material D max. 11 parts | Calcium hydroxide B 90 parts |

The values listed in the above table, can preferably be usable compositions, and variations in one component could be compensated for in another component. For example, if it were desirable to keep the amounts of calcium hydroxide to a minimum, possibly due to economic considerations, more, or possibly less, of the inert material could be used.

The definitions of the terms used in the tables are explained below.

Inert materials 1''' are inert materials with a grain density which is higher than the activated coke and with a $d_{97}$ value in the range of greater than or equal to 50% in relation to the activated coke used.

Inert materials 2''', in contrast to inert material 1''', are finely-divided calcium hydroxides, and are used in the airstream process as a reagent for the separation of acid components of the gaseous pollutants.

| | |
|---|---|
| Activated Coke A: | Metallurgical coke 0% residue to 75 μm<br>RRSB: not indicated<br>Grain density: $p_K$ = 0.95 g/cm³ |
| Activated Coke B: | Metallurgical coke 3% residue to 110 μm<br>RRSB: d' 36 μm, n = 1.08<br>Grain density: $p_K$ = 0.95 g/cm³ |
| Activated Coke C: | Metallurgical coke 3% residue to 200 μm<br>RRSB: d' = 52 μm, n = 0.94<br>Grain density $p_K$ = 0.95 g/cm³ |
| Activated Coke D: | Activated coke on peat basis<br>3% residue to 158 μm<br>RRSB: d' = 28 μm, n = 0.73<br>Grain density $p_K$ = approx. 0.8 g/cm³ |
| Inert Material A: | Powdered limestone 3% residue to 85.5 μm<br>RRSB: $d_1$ = 15.3 μm, n = 0.73<br>Grain density $p_K$ = 2.66 g/cm³ |
| Inert Material B: | Powdered limestone 3% residue to 85.5 μm<br>RRSB: $d_1$ = 30 μm, n = 1.2<br>Grain density $p_K$ = 2.66 g/cm³ |
| Inert Material C: | Powdered limestone 3% residue to 85.5 μm<br>RRSB: $d_1$ = 11 μm, n = 0.6<br>Grain density $p_K$ = 2.66 g/cm³ |
| Inert Material D: | Powdered limestone 3% residue to 105 μm<br>RRSB: $d_1$ = 30 μm, n = 0.97<br>Grain density $p_K$ = 2.66 g/cm³ |
| Inert Material E: | Powdered limestone 3% residue to 145 μm<br>RRSB: d' = 39 μm, n = 0.96<br>Grain density $p_K$ = 2.66 g/cm³ |
| Calcium Hydroxide A: | Calcium hydroxide 3% residue to 47 μm<br>50% residue to 5.2 μm<br>Grain density $p_K$ = approx. 0.8 g/cm³ |
| Calcium Hydroxide B: | Calcium hydroxide 3% residue to 22 μm<br>50% residue to 3.4 μm<br>Grain density $p_K$ = approx. 0.6 g/cm³ |

With regard to the last two designations, it should be noted that it is not appropriate to characterize calcium hydroxides by RRSB grain size distribution parameters, since the grain size distributions of these materials cannot be described by straight lines in the RRSB system.

One possible interpretation of the table listed immediately above, with regard to Activated Coke B for example, is that 3% of the metallurgical coke has a grain size diameter of greater than 110 μm.

In accordance with certain embodiments, it is conceivable that d' represents the coarse grain size of a particular particle. Further, it may be conceivable in some embodiments that d' is the $d_{97}$ value. It should also be noted that, in accordance with at least one embodiment, the word "inert", when used in this specification, does not necessarily refer to the chemical definition of "inert". Thus, use of the word "inert", when used to describe powdered limestone and calcium hydroxide, may instead imply that these two substances are inert with respect to the activated coke material, and therefore may not react chemically with the activated coke material. Further, in accordance with at least one embodiment, the powdered limestone and the calcium hydroxide may also be inert with respect to the activated coke material in that they may not contribute to the flammability of the activated coke material.

Further, in accordance with at least one embodiment, the powdered limestone may be inert with respect to reactivity and flammability with the activated coke material and with respect to the exhaust gas itself.

The calcium hydroxide, in accordance with at least one embodiment, may be inert with respect to reactivity and flammability with respect to the activated coke material, but is preferably reactive with the acidic components of the exhaust gas.

Thus, in accordance with one embodiment, when the grain size distribution of the powdered limestone is matched to the grain size distribution of the activated coke material, possibly by testing their speeds of vertical descent in a gas medium at rest, when the mixture of powdered limestone and activated coke material is introduced into the exhaust gas flow, the coarse grain of the powdered limestone and the coarse grain of the activated coke can preferably vertically descend through the exhaust gas at substantially the same speed. Therefore, the grains of the powdered limestone can conceivably act as a "barrier" between the grains of the activated coke material, and can possibly prevent combustion or explosion of the grains of the activated coke material.

Figure 2:
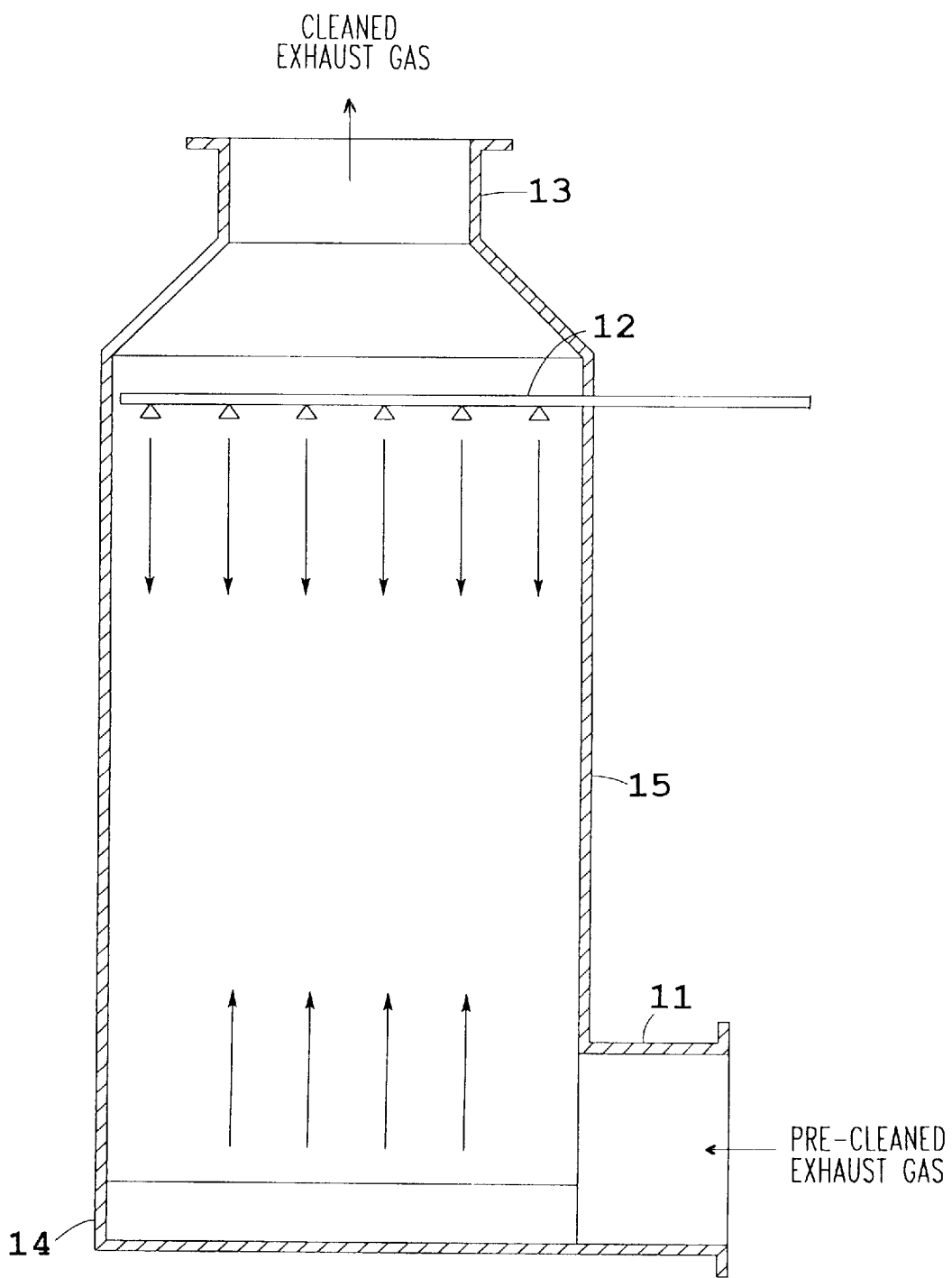
FIG. 2 shows an apparatus for cleaning exhaust gas.

FIG. 2 shows a schematic representation of an exhaust gas cleaning apparatus which could be utilized in accordance with the present invention. In accordance with the embodiment shown in FIG. 2, the pre-cleaned exhaust gas can be introduced into shaft 15 from below from a passage 11. The powdered mixture of activated coke and inert materials, and possibly calcium hydroxide in accordance with the present invention, can be injected or blown into shaft 15 with the aid of nozzles 12, which nozzles 12 can be distributed substantially evenly across the apparatus.

Thus, the powdered mixture can descend and can react with certain constituents of the ascending pre-cleaned exhaust gas. The cleaned exhaust gas can then exit at the top 13 of the apparatus.

Further, the apparatus shown in FIG. 2 can also have a collection device 14 for collecting the impurities removed from the exhaust gas. A filter could also be used as a collection device.

In accordance with an alternative embodiment not shown here, the pre-cleaned exhaust gas could be introduced into the apparatus at or near the top 13 and could exit through passage 11.

One possible temperature range at which the exhaust gas may react with the powdered mixture is about 20° C. to about 400° C. Another possible temperature range at which the exhaust gas may react with the powered mixture in accordance with an additional embodiment 400° C. to about 900° C. It should be understood that the temperature ranges stated above are only approximations and that such ranges could extend to greater or lower temperatures depending on the particular operating conditions.

In accordance with an additional alternative embodiment, the powdered mixture could be introduced into the apparatus illustrated in FIG. 2 in stages along the shaft 15 of the apparatus. Thus, there could preferably be several sets of nozzles 12 disposed at points between the position of the nozzles 12 shown in FIG. 2 and the collection device 14.

The present invention, in accordance with at least one embodiment, can be used to clean exhaust gases from waste or refuse incineration plants. Such refuse incineration plants can preferably be used to process household refuse, waste, or rubbish.

It is also conceivable that the present invention, in accordance with additional embodiments, could be used to clean the exhaust gas which results from the processing of industrial waste, such as chemical waste. Further, the present invention may, in accordance with additional conceivable embodiments, be used to clean the exhaust gas resulting from the processing of oils, tires, or other types of industrial and consumer waste.

Figure 3:
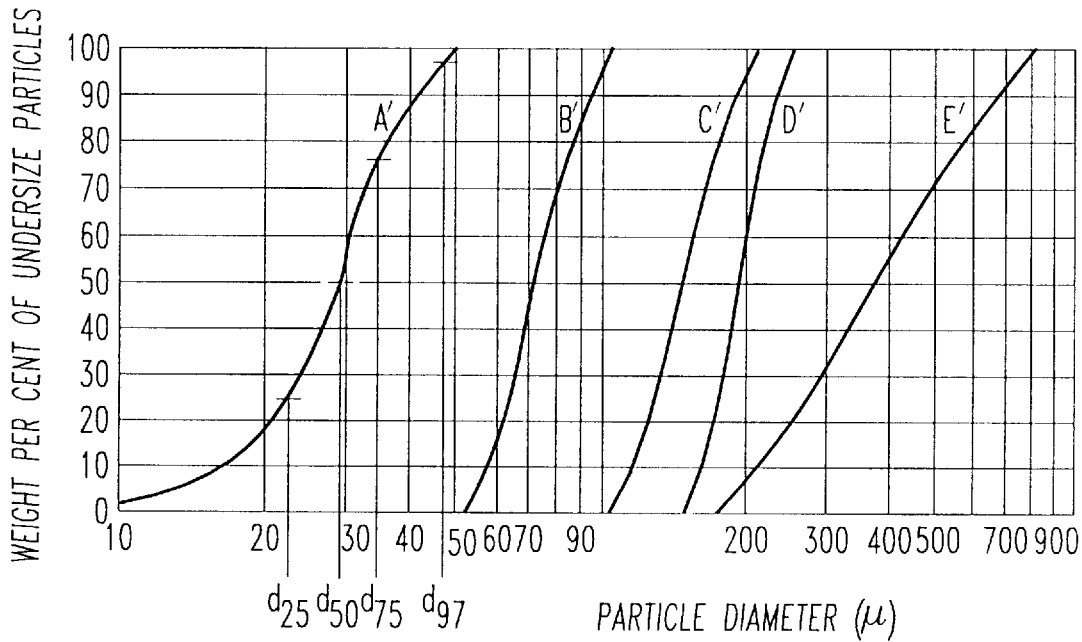
FIG. 3 shows one example of various possible grain distribution lines.
Figure 4:
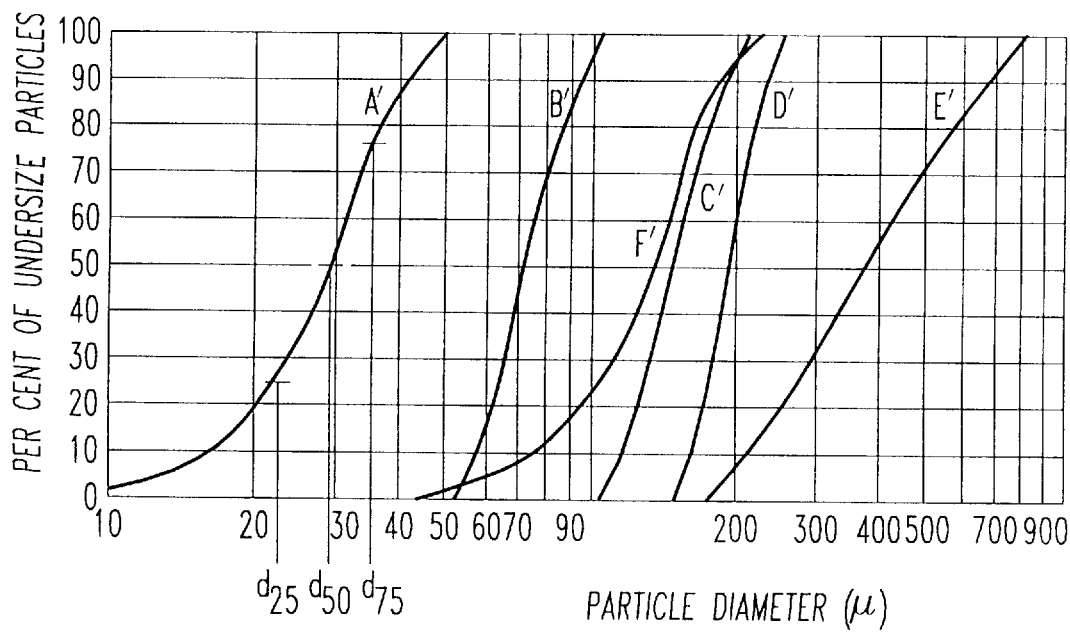
FIG. 4 shows an additional example of possible grain distribution lines for activated coke and an inert material.

FIG. 3 shows several examples of possible grain distribution lines. The cumulative weight percentage of undersize particles is plotted against the particle diameter in μ. The cumulative percentage can also refer to number of particles or volume of particles. The graph shown in FIG. 3 could, in accordance with one embodiment of the present invention, be used to match the grain size distribution of the activated coke component and at least one of the inert components. For example, lines A', B', C', D', and E' could possibly correspond to the grain size distribution lines of various types of activated coke. The grain size distribution lines of the inert material (i.e. the inert material which is to match the grain size distribution of the activated coke in accordance with the present invention) could then be plotted on the same graph, as is shown in FIG. 4. Thus, the inert materials which have slopes equal to or greater than the activated coke which is to be used can be selected and incorporated into the powdered mixture described above.

As stated above, the graphs shown in FIGS. 3 and 4 could conceivably be used to match the grain size distribution of the activated coke and the inert material (i.e. the powdered limestone). For example, in FIG. 4, F' could represent the grain distribution line of the inert material, or powdered limestone, and C' could represent the the grain distribution line of the activated coke.

In addition to Examples 1 and 2 presented further above, the following examples may be possible in certain embodiments to reduce or even completely prevent foaming:

It may be possible to reduce or even completely prevent foaming when lime hydrate (manufactured as discussed herebelow in U.S. Pat. No. 4,636,379) is mixed with about 0.1%, 0.2%, 0.3%, 0.4%, 0.5%, 0.6%, 0.7%, 0.8%, 0.9%, 1.0%, 1.1%, 1.2%, 1.3%, 1.4%, 1.5%, 1.6%, 1.7% 1.8%, 1.9%, 2.0%, 2.5%, 3.0%, 3.5%, 4.0%, 4.5% or 5.0% of activated carbon dust and then dispersed in water to form about a 15% suspension.

Further, it may also be possible to reduce or even completely prevent foaming when lime hydrate (manufactured as discussed herebelow in U.S. Pat. No. 4,636,379) is mixed with about 1% of activated carbon dust and then dispersed in water to form about a 10%, 11%, 12%, 13%, 15%, 14%, 16%, 17%, 18%, 19% or 20% suspension.

Still further, it may also be possible to reduce or even completely prevent foaming when lime hydrate (manufactured as discussed herebelow in U.S. Pat. No. 4,636,379) is mixed with about 0.1%, 0.2%, 0.3%, 0.4%, 0.5%, 0.6%, 0.7%, 0.8%, 0.9%, 1.0%, 1.1%, 1.2%, 1.3%, 1.4%, 1.5%, 1.6%, 1.7% 1.8%, 1.9%, 2.0%, 2.5%, 3.0%, 3.5%, 4.0%, 4.5% or 5.0% of activated carbon dust and then dispersed in water to form about a 10%, 11%, 12%, 13%, 14%, 15%, 16%, 17%, 18%, 19%, or 20% suspension.

Further, it may be also be possible to reduce or even completely prevent foaming if lime hydrate (manufactured as discussed herebelow in U.S. Pat. No. 4,636,379) is dispersed to about a 20% suspension, and about 2% of finely-divided open hearth furnace coke is added to the water in advance of the dispersal of the lime hydrate in the water.

In addition, it may also be possible to reduce or even completely prevent foaming if 0.1%, 0.2%, 0.3%, 0.4%, 0.5%, 0.6%, 0.7%, 0.8%, 0.9%, 1.0%, 1.5%, 1.6%, 1.7%, 1.8%, 1.9%, 2.0%, 2.5%, 3.0%, 3.5%, 4.0%, 4.5%, or 5.0% of finely-divided open hearth furnace coke is added to the water in advance of the dispersal of lime hydrate (manufactured as disclosed in German Patent DE 34 33 228, which corresponds to U.S. Pat. No. 4,636,379), to about a 20% suspension.

In addition, it may also be possible to reduce or even completely prevent foaming if about 2% of finely-divided open hearth furnace coke is added to the water in advance of the dispersal of lime hydrate (manufactured as disclosed in German Patent DE 34 33 228, which corresponds to U.S. Pat. No. 4,636,379), to about a 15%, 16%, 17%, 18%, 19%, 20%, 21%, 22%, 23%, 24% or 25% suspension.

In addition, it may also be possible to reduce or even completely prevent foaming if about 0.1%, 0.2%, 0.3%, 0.4%, 0.5%, 0.6%, 0.7%, 0.8%, 0.9%, 1.0%, 1.5%, 1.6%, 1.7%, 1.8%, 1.9%, 2.0%, 2.5%, 3.0%, 3.5%, 4.0%, 4.5%, or 5.0% of finely-divided open hearth furnace coke is added to the water in advance of the dispersal of lime hydrate (manufactured as disclosed in German Patent DE 34 33 228, which corresponds to U.S. Pat. No. 4,636,379), to about a 15%, 16%, 17%, 18%, 19%, 20%, 21%, 22%, 23%, 24% or 25% suspension.

One feature of the invention resides broadly in the process for the manufacture of milk of lime, characterized by the fact that the milk of lime is manufactured by the suspension of lime hydrates and/or dolomite lime hydrates which were quenched with the addition of organic solvents and/or organic additives and have a specific surface which is larger than normal hydrate in water in the presence of finely-powdered activated cokes.

Another feature of the invention resides broadly in the process characterized by the fact that the activated cokes are added in proportions of 0.2 to 3% by weight in relation to the dry lime hydrate.

Yet another feature of the invention resides broadly in the process characterized by the fact that lime hydrate and/or dolomite lime hydrate is mixed with the activated cokes before the suspension in water.

Still another feature of the invention resides broadly in the process characterized by the fact that the activated coke is mixed with the water before or during the addition of the lime hydrate and/or dolomite lime hydrate.

A further feature of the invention resides broadly in the process characterized by the fact that the activated cokes are added during the manufacture of lime hydrate and/or dolomite lime hydrate.

Some examples of methods and/or processes for producing calcium hydroxide and/or lime hydrate which may be utilized in accordance with the present invention are disclosed in the following U.S. Pat. Nos. 4,636,379 to Bestek et al. on Jan. 13, 1987, entitled "Process for Producing Calcium Hydroxide"; 4,382,911 to Pennell on May 10, 1983, entitled "Hydration of Lime"; 4,401,645 to Gisler on Aug. 30, 1983, entitled "Lime Slaking Method"; 4,464,353 to Hains on Aug. 7, 1984, entitled "Quicklime Slaking Process"; 4,472,370 to Miyata et al. on Sep. 18, 1984, entitled "Processes for the Production of Slaked Lime and Magnesium Hydroxide"; and 4,547,349 to Lane on Oct. 15, 1985, entitled "Method of Slaking Lime".

A method of measuring specific surface and an apparatus for performing same which may be utilized in accordance with the present invention is disclosed in U.S. Pat. No. 4,475,391 to Zavadil on Oct. 9, 1984, entitled "Method for Measuring the Specific Surface of Pulverized Materials and Apparatus for Performing the Same".

Methods of cleaning exhaust gases in which the present invention may be utilized are disclosed in the following U.S. Pat. Nos. 5,209,912 to Suchenwirth on May 11, 1993, entitled "Process for Separating Out Noxious Substances from Gases and Exhaust Gases"; and 5,257,588 to Kollmann on Nov. 2, 1993, entitled "Method for the Abatement of Flue Gas From a Process of Combustion, More Particularly a Refuse Incinerating Plant".

Various methods of cleaning exhaust gases which may be utilized in accordance with the present invention may be disclosed in the following U.S. Pat. Nos. 5,254,797 to Imoto et al. on Oct. 19, 1993, entitled "Method of Treating Exhaust Gas"; 5,185,134 to Gullett on Feb. 9, 1993, entitled "Reduction of Chlorinated Organics in the Incineration of Wastes"; 5,220,111 to Bucci et al. on Jun. 15, 1993, entitled "Fixation of Heavy Metals in Scrubbed Municipal Solid Waste Incinerator Ash"; and 5,186,916 to Nevels on Feb. 16, 1993, entitled "Method for Purifiying Flue-gases".

Examples of brown coal which may possibly be utilized in accordance with the present invention may be disclosed in the following U.S. Pat. Nos. 5,347,068 to Rabe et al. on Sep. 13, 1994, entitled "Method of Simultaneous Disposal of Solid and Liquid Wastes"; 4,913,097 to Derksen et al. on Apr. 3, 1990, entitled "Steam Generator That Burns Brown Coal With Cinders That Vary in Composition"; 4,941,772 to Roesky et al. on Jul. 17, 1990, entitled "Method of Disposing Salt-containing Dusts from Incinerator Plants"; RE33855 (Reissue of U.S. Pat. No. 4,678,591) to Giddings et al. on Mar. 24, 1992, entitled "Terpolymer Composition for Aqueous Drilling Fluids"; 4,659,557 to Lenz et al. on Apr. 21, 1987, entitled "Process for Producing Ferrous Sulphate in Granule Form"; 4,678,591 to Giddings et al. on Jul. 7, 1987, entitled "Terpolymer Composition for Aqueous Drilling Fluids"; and 4,714,543 to Matsumura et al. on Dec. 22, 1987, entitled "Method of Treating Brown Coal for Liquefaction".

Examples of burnt lime which may be utilized in accordance with the present invention may be disclosed in the following U.S. Pat. Nos. 5,306,475 to Fichtel et al. on Apr. 26, 1994, entitled "Reactive Calcium Hydroxides"; and 5,354,375 to Cohen on Oct. 11, 1994, entitled "Lime Sludge Treatment Process".

Examples of furnaces which may be utilized in accordance with the present invention may be disclosed in the following U.S. Pat. Nos. 5,266,027 to Kuwayama on Nov. 30, 1993, entitled "Roller-hearth Continuous Furnace"; 5,282,742 to Ellringmann on Feb. 1, 1994, entitled "Double Walking Beam Furnace for the Heat Treatment of Individual Parts"; 5,316,471 to Nell on May 31, 1994, entitled "Method and Apparatus for Mass Transfer in Multiple Hearth Furnaces"; and 5,367,532 to Boen et al. on Nov. 22, 1994, entitled "Furnace for the Continuous Melting of Oxide Mixtures by Direct Induction With High Frequency, a Very Short Refining Time and a Low Energy Consumption".

Additional methods of cleaning exhaust gases involving the sorption process which may be utilized in accordance with the present invention may be disclosed in the following U.S. Pat. Nos. 5,320,817 to Hardwick et al. on Jun. 14, 1994, entitled "Process for Sorption of Hazardous Waste Products from Exhaust Gas Streams"; 5,291,942 to Ryan on Mar. 8, 1994, entitled "Multiple Stage Sorption and Desorption Process and Apparatus"; 5,209,912 to Suchenwirth on May 11, 1993, entitled "Process for Separating Out Noxious Substances from Gases and Exhaust Gases"; and 5,277,837 to Dumont et al. on Jan. 11, 1994, entitled "Method and Composition for Treating Flue or Exhaust Gases Utilizing Modified Calcium Hydroxide".

Methods for forming activated cokes and carbons which may be utilized in accordance with the present invention may be disclosed in the following U.S. Pat. Nos. 5,270,279 to Shiraishi on Dec. 14, 1993, entitled "Production Process of Formed Activated Coke for SOx and NOx Removal Having High NOx-Removing Ability"; 5,187,141 to Jha et al. on Feb. 16, 1993, entitled "Process for the Manufacture of Activated Carbon from Coal by Mild Gasification and Hydrogenation"; 5,202,302 to De La Pena et al. on Apr. 13, 1993, entitled "Preparation of Activated Carbons by Impregnation With a Boron Compound and a Phosphorous Compound"; and 5,209,887 to Von Blucher et al. on May 11, 1993, entitled "Process for Manufacturing Micro-spherules of Activated Carbon".

Various apparatuses and processes for incinerating refuse which could possibly be used in the context of the present invention are more fully disclosed in the following U.S. Pat. Nos. 4,006,693 to Hans Kunstler, entitled "Combustion Furnace Construction Particularly a Refuse Incinerator"; 4,516,511 to Tsung Kuo, entitled "Refuse Incineration Apparatus"; 4,706,560 to Gaetano Capodicasa, entitled "Refuse Treatment Apparatus"; 4,936,231 to Loyd Johnson, entitled "Solid Waste Garbage Incineration System"; 4,949,653 to James Rast, entitled "Process and Apparatus for Incineration"; and 5,009,173 to Sedat Temelli, entitled Apparatus for Incineration of Refuse.

Similarly, various apparatuses and process for cleaning of the flue gases which could possibly be used in the context of the present invention may be disclosed in the following U.S. Pat. Nos. 5,018,457 to Brady et al., entitled "Waste Treatment System"; 5,050,508 to Paul Wilson, entitled "System for the Incineration of Refuse and the Treatment of the Incineration Exhaust Gasses"; and 5,127,347 to Eric Cheetham, entitled "Method and Apparatus for the Reduction of Solid Waste Material Using Coherent Radiation".

Filter arrangements which could be utilized in accordance with the present invention may be found in the following U.S. Pat. Nos. 4,416,674 to McMahon et al., entitled Filter for Treating a Particle-Carrying Gaseous Stream; 4,862,813 to Levin et al., entitled "High Temperature Gas Cleaning in Municipal Solid Waste Incineration Systems"; 4,971,769 to Hans Haerle, entitled "Filter Device of use in Heating or Incineration Plants".

Methods of cleaning flue or exhaust gas using calcium compounds which may be utilized in accordance with the present invention may be disclosed in the following U.S. Pat. Nos. 5,270,015 to Rochelle et al. on Dec. 14, 1993, entitled "Apparatus for Removing Sulfur from Sulfur Containing Gases"; and 5,306,475 to Fichtel et al. on Apr. 26, 1994, entitled "Reactive Calcium Hydroxides".

All, or substantially all, of the components and methods of the various embodiments may be used with at least one embodiment or all of the embodiments, if more than one embodiment is described herein.

All of the patents, patent applications and publications recited herein, and in the Declaration attached hereto, are hereby incorporated by reference as if set forth in their entirety herein.

The corresponding foreign patent publication applications, namely, Federal Republic of Germany Patent Application No. P 195 10 122.7–45, filed on Mar. 21, 1995, having inventor Michael Webeling, and DE-OS 195 10 122.7–45 and DE-PS 195 10 122.7–45, as well as their published equivalents, and other equivalents or corresponding applications, if any, in corresponding cases in the Federal Republic of Germany and elsewhere, and the references cited in any of the documents cited herein, are hereby incorporated by reference as if set forth in their entirety herein.

The details in the patents, patent applications and publications may be considered to be incorporable, at applicant's option, into the claims during prosecution as further limitations in the claims to patentably distinguish any amended claims from any applied prior art.

The invention as described hereinabove in the context of the preferred embodiments is not to be taken as limited to all of the provided details thereof, since modifications and variations thereof may be made without departing from the spirit and scope of the invention.

What is claimed is:

1. Process for manufacturing milk of lime which reduces foaming during the manufacture of milk of lime, said process comprising:

slaking burnt lime with the addition of an organic compound;

thus producing slaked lime hydrate having a specific surface larger than hydrate having a specific surface between about 15 $m^2/g$ and about 22 $m^2/g$;

said organic compound being selected from the group consisting of: organic solvents and organic additives; and reducing foaming and forming said milk of lime during manufacturing of said milk of lime by suspending said slaked lime hydrate in water in the presence of pulverized activated coke.

2. The process according to claim 1 comprising adding said activated coke in a proportion of about 0.2 to about 3% by weight in relation to said lime hydrate and wherein said lime hydrate has a specific surface greater than about 30 $m^2/g$.

3. The process according to claim 2 comprising mixing said lime hydrate with said activated coke prior to said step of suspending.

4. The process according to claim 2 comprising mixing said activated coke with the suspension water before adding said lime hydrate to the suspension water.

5. The process according to claim 2 comprising mixing said activated coke with the suspension water while adding said lime hydrate to the suspension water.

6. The process according to claim 2 comprising adding said activated coke to said lime hydrate during the manufacture of said lime hydrate.

7. Process for manufacturing milk of lime which reduces foaming during the manufacture of milk of lime, said process comprising:

slaking dolomite lime with the addition of an organic compound;

thus producing slaked dolomite lime hydrate having a specific surface larger than hydrate having a specific surface between about 15 $m^2/g$ and about 22 $m^2/g$;

said organic compound being selected from the group consisting of: organic solvents and organic additives; and reducing foaming and forming said milk of lime during manufacturing of said milk of lime by suspending said slaked dolomite lime hydrate in water in the presence of pulverized activated coke.

8. The process according to claim 7 comprising adding said activated coke in a proportion of about 0.2 to about 3% by weight in relation to said dolomite lime hydrate and wherein said dolomite lime hydrate has a specific surface greater than about 30 $m^2/g$.

9. The process according to claim 8 comprising mixing said dolomite lime hydrate with said activated coke prior to said step of suspending.

10. The process according to claim 8 comprising mixing said activated coke with the suspension water before adding said dolomite lime hydrate to the suspension water.

11. The process according to claim 8 comprising mixing said activated coke with the suspension water while adding said dolomite lime hydrate to the suspension water.

12. The process according to claim 8 comprising adding said activated coke to said dolomite lime hydrate during the manufacture of said dolomite lime hydrate.

* * * * *

UNITED STATES PATENT AND TRADEMARK OFFICE
CERTIFICATE OF CORRECTION

Page 1 of 2

PATENT NO. : 5,876,689
DATED : March 2, 1999
INVENTOR(S) : Michael WEBELING, Ulrich GLINKA, Jürgen LABUSCHEWSKI, and Walter HESS It is certified that error appears in the above-identified patent and that said Letters Patent is hereby corrected as shown below:

In column 7, after the first solid black line at line 1, insert --EXAMPLE 1' ACCORDING TO PROCESS WHICH CAN BE UTILIZED IN ACCORDANCE WITH THE PRESENT INVENTION--.

In column 7, after the third solid line near line 23, insert --EXAMPLE 2' ACCORDING TO PROCESS WHICH CAN BE UTILIZED IN ACCORDANCE WITH THE PRESENT INVENTION--.

In column 8, after the third solid black line near line 7, insert --EXAMPLE 4' ACCORDING TO PROCESS WHICH CAN BE UTILIZED IN ACCORDANCE WITH THE PRESENT INVENTION--.

In column 15, line 5 of the table, after 'RRSB:', delete " d'36 " and insert --d'=36--.

In column 15, line 16 of the table, after 'RRSB:', delete "$d_1$" and insert --d'--.

UNITED STATES PATENT AND TRADEMARK OFFICE
CERTIFICATE OF CORRECTION

PATENT NO. : 5,876,689
DATED : March 2, 1999
INVENTOR(S) : Michael WEBELING, Ulrich GLINKA, Jürgen LABUSCHEWSKI, and Walter HESS It is certified that error appears in the above-identified patent and that said Letters Patent is hereby corrected as shown below:

In column 15, line 19 of the table, after 'RRSB:', delete "$d_1$" and insert --$d'$--.

In column 15, line 22 of the table, after 'RRSB:', delete "$d_1$" and insert --$d'$--.

In column 15, line 25 of the table, after 'RRSB:', delete "$d_1$" and insert --$d'$--.

Signed and Sealed this

Sixteenth Day of November, 1999

*Attest:*

Q. TODD DICKINSON

*Attesting Officer*     *Acting Commissioner of Patents and Trademarks*